US012166264B2

(12) United States Patent
Yuan et al.

(10) Patent No.: US 12,166,264 B2
(45) Date of Patent: Dec. 10, 2024

(54) ADJUSTABLE DOWNTILT ANTENNA MOUNTING BRACKETS AND RELATED ASSEMBLIES

(71) Applicant: Outdoor Wireless Networks LLC, Claremont, NC (US)

(72) Inventors: Jianbo Yuan, Suzhou (CN); Junfeng Yu, Suzhou (CN); Xiaohua Tian, Suzhou (CN); Xiaoan Fu, Suzhou (CN); Zunbiao Ge, Suzhou (CN); Jiaping Xu, Suzhou (CN)

(73) Assignee: Outdoor Wireless Networks LLC, Claremont, NC (US)

( * ) Notice: Subject to any disclaimer, the term of this patent is extended or adjusted under 35 U.S.C. 154(b) by 112 days.

(21) Appl. No.: 18/154,242

(22) Filed: Jan. 13, 2023

(65) Prior Publication Data

US 2023/0268634 A1 Aug. 24, 2023

Related U.S. Application Data

(60) Provisional application No. 63/312,527, filed on Feb. 22, 2022.

(51) Int. Cl.
*H01Q 1/12* (2006.01)
*H01Q 3/04* (2006.01)

(52) U.S. Cl.
CPC ............ *H01Q 1/1228* (2013.01); *H01Q 3/04* (2013.01)

(58) Field of Classification Search
CPC .......... H01Q 1/1228; H01Q 3/04; H01Q 3/06; H01Q 1/125
See application file for complete search history.

(56) References Cited

U.S. PATENT DOCUMENTS

2020/0411944 A1 * 12/2020 Lekselius ................ H01Q 3/06
2021/0265725 A1 * 8/2021 Clifford .................. H01Q 3/32

* cited by examiner

*Primary Examiner* — David E Lotter
(74) *Attorney, Agent, or Firm* — Myers Bigel, P.A.

(57) ABSTRACT

The present disclosure is directed to a mounting bracket adapted for adjusting the downtilt of an antenna. The mounting bracket includes a first member and a second member. The first member is coupled to the second member at one end via a first pair of securing features and is coupled to an antenna mounting bracket at an opposing end via a second pair of securing features. The first member is configured to rotate about the first and second pairs of securing features relative to the second member and antenna mounting bracket, respectively. The second member includes two slots on opposing sides that extend longitudinally along a length of the second member in a vertical direction, each of the first pair of securing features extends through and is configured to slide within a respective slot such that, when an antenna is secured to the antenna mounting bracket, sliding the first pair of securing features in a first direction increases an angle of downtilt for the antenna and sliding the first pair of securing features in a second direction decreases the angle of downtilt for the antenna. The second member is configured to be secured to a mounting structure. Other adjustable downtilt antenna mounting brackets and related assemblies are described herein.

20 Claims, 11 Drawing Sheets

ADJUSTABLE DOWNTILT ANTENNA MOUNTING BRACKETS AND RELATED ASSEMBLIES

RELATED APPLICATION(S)

The present application claims priority to and the benefit of U.S. Provisional Patent Application Ser. No. 63/312,527, filed Feb. 22, 2022, the disclosure of which is hereby incorporated herein in its entirety.

FIELD

The invention relates generally to telecommunications equipment, and more particularly, to antenna mounting brackets adapted for adjusting the downtilt of the antenna and related assemblies.

BACKGROUND

Currently, to adjust the angle of downtilt, some antennas employ pivoting or sliding brackets. For example, as shown in FIG. 1, a known adjustable downtilt antenna assembly 10 includes an antenna 50 that is secured to a mounting structure 40 (e.g., a mounting pole) via three brackets 20, 25, 30. As illustrated in FIG. 1, these brackets 20, 25, 30 rotate, pivot and/or scissor to allow the antenna 50 to tilt at a desired downtilt angle (α). FIG. 2 shows another known adjustable downtilt antenna assembly 10'. The antenna assembly 10' includes an antenna 50 (and corresponding radio 55) that is secured to a mounting pole 40 via three brackets 20', 25', 30'. Similarly, as illustrated in FIG. 2, these bracket 20, 25, 30 rotate, pivot, and/or slide to allow the antenna 50 (and corresponding radio 55) to tilt at a desired downtilt angle (α). Each of these current solutions have disadvantages such as requiring multiple components to be adjusted/tightened in order to adjust the angle (α) of downtilt for a corresponding antenna 50, 50'. For example, 28 nuts need to be adjusted/tightened in the antenna assembly 10 illustrated in FIGS. 1 and 16 nuts need to be adjusted/tightened in the antenna assembly 10' illustrated in FIG. 2 in order to adjust the angle (α) of downtilt for the respective antenna assemblies 10, 10'. This makes operation of the respective antenna assemblies 10, 10' complicated, thereby leading to higher costs of operation.

SUMMARY

A first aspect of the present invention is directed to a mounting bracket adapted for adjusting the downtilt of an antenna. The mounting bracket includes a first member and a second member. The first member is coupled to the second member at one end via a first pair of securing features and is coupled to an antenna mounting bracket at an opposing end via a second pair of securing features. The first member is configured to rotate about the first and second pairs of securing features relative to the second member and antenna mounting bracket, respectively. The second member includes two slots on opposing sides that extend longitudinally along a length of the second member in a vertical direction, each of the first pair of securing features extends through and is configured to slide within a respective slot such that, when an antenna is secured to the antenna mounting bracket, sliding the first pair of securing features in a first direction increases an angle of downtilt for the antenna and sliding the first pair of securing features in a second direction decreases the angle of downtilt for the antenna. The second member is configured to be secured to a mounting structure.

Another aspect of the present invention is directed to mounting bracket adapted for adjusting the downtilt of an antenna. The mounting bracket includes a first member and a second member. The second member includes two slots on opposing sides and extending longitudinally along a length of the second member in a vertical direction. Each of a first pair of securing features extends through and is configured to slide within a respective slot. The mounting bracket further includes an adjustment slider slideably coupled within the second member via the first pair of securing features and an adjustment bolt. The first member is coupled to the second member and adjustment slider at one end via the first pair of securing features and is coupled to an antenna mounting bracket at an opposing end via a second pair of securing features. The first member is configured to rotate about the first and second pairs of securing features relative to the second member and antenna mounting bracket, respectively. Rotation of the adjustment bolt raises or lowers the adjustment slider relative to the second member to adjust the angle of downtilt of a corresponding antenna. The second member is configured to be secured to a mounting structure.

Another aspect of the present invention is directed to a mounting bracket adapted for adjusting the downtilt of an antenna. The mounting bracket includes a first member and a second member. The second member includes two slots on opposing sides and extending longitudinally along a length of the second member in a vertical direction. Each of the first pair of securing features extends through and is configured to slide within a respective slot. The mounting bracket further includes an adjustment slider slideably coupled within the second member via the first pair of securing features and an adjustment bolt. The first member is coupled to the second member and adjustment slider at one end via a first pair of securing features and is coupled to an antenna mounting bracket at an opposing end via a second pair of securing features. The first member is configured to rotate about the first and second pairs of securing features relative to the second member and antenna mounting bracket, respectively. The mounting bracket further includes a driving mechanism coupled to the adjustment bolt. The driving mechanism is configured to rotate the adjustment bolt to raise or lower the adjustment slider relative to the second member to adjust the angle of downtilt of a corresponding antenna. The second member is configured to be secured to a mounting structure.

Another aspect of the present invention is directed to a mounting bracket adapted for adjusting the downtilt of an antenna. The mounting bracket includes a first member and a second member. The second member is configured to be secured to a mounting structure. The mounting bracket further includes an adjustment slider slideably coupled to the second member. The second member defines a slidable axis substantially parallel to an axis of the mounting structure. The first member is coupled to the adjustment slider at one end and coupled to an antenna mounting bracket at an opposing end and configured to rotate relative to the adjustment slider and antenna mounting bracket, respectively. The adjustment slider is configured to slide along the slidable axis to adjust the angle of downtilt of a corresponding antenna secured to the antenna mounting bracket.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

DETAILED DESCRIPTION

Figure 1:
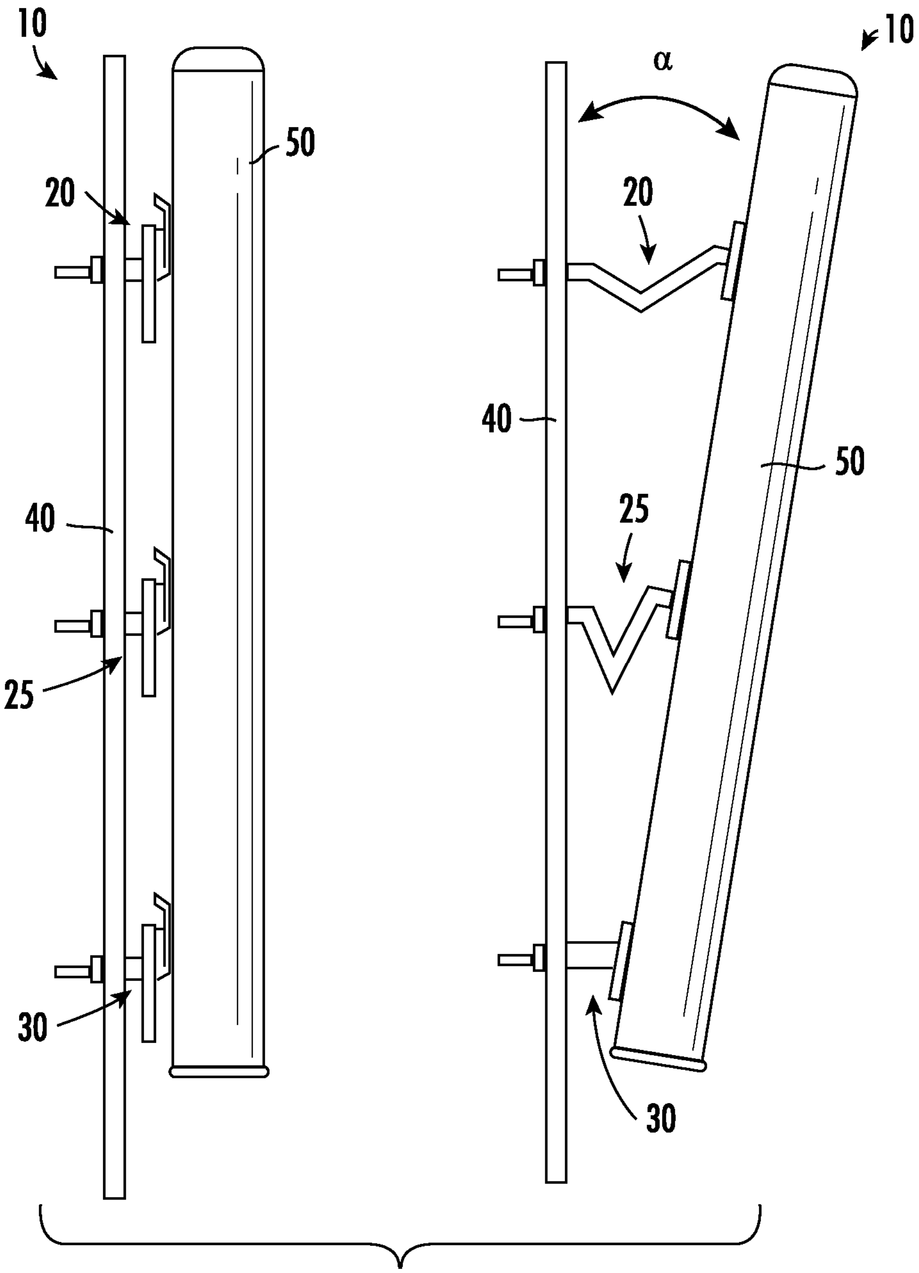
FIG. 1 PRIOR ART
FIG. 1 illustrates an antenna assembly utilizing a known adjustable downtilt mounting bracket assembly shown in upright and angled orientations.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the figures, certain layers, components, or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer, or section. Thus, a first element, component, region, layer, or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Figure 2:
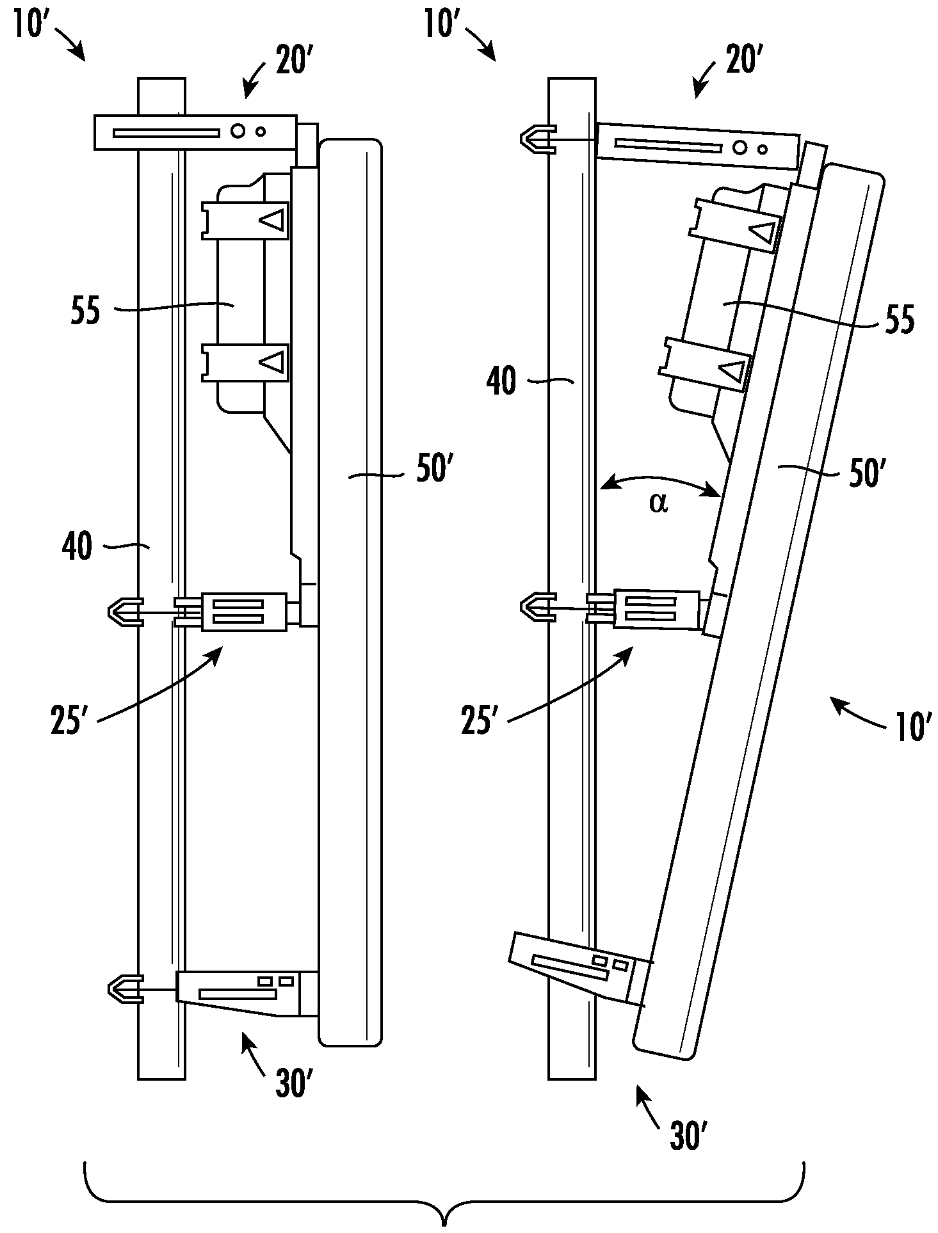
FIG. 2 PRIOR ART
FIG. 2 illustrates an antenna assembly utilizing another known adjustable downtilt mounting bracket assembly shown in upright and angled orientations.
Figure 3A:
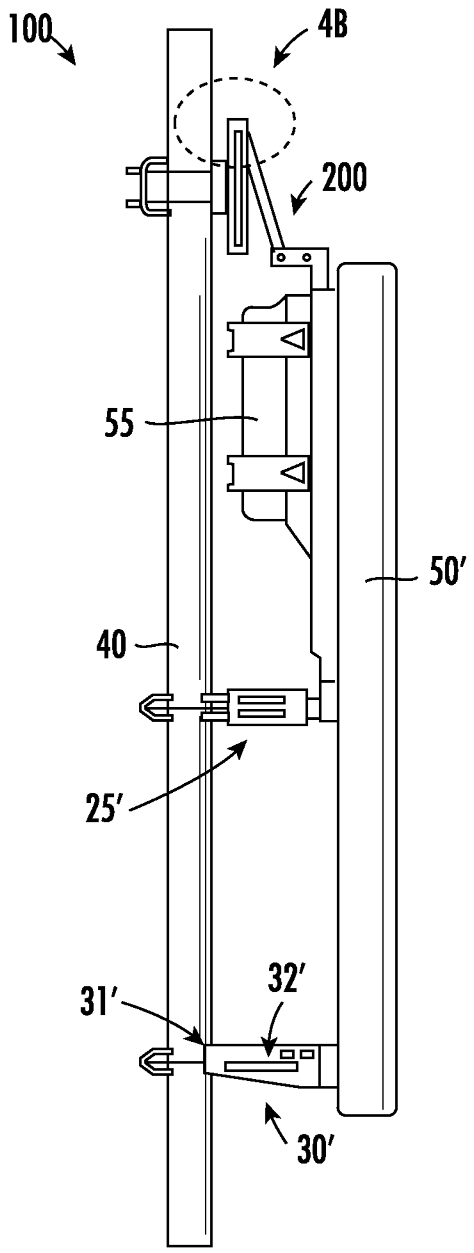
FIG. 3A is a side view of an antenna assembly illustrating the minimum angle of downtilt employed on the antenna (i.e., an upright orientation of 0 degrees) utilizing an adjustable downtilt mounting bracket assembly according to embodiments of the present invention.
Figure 3B:
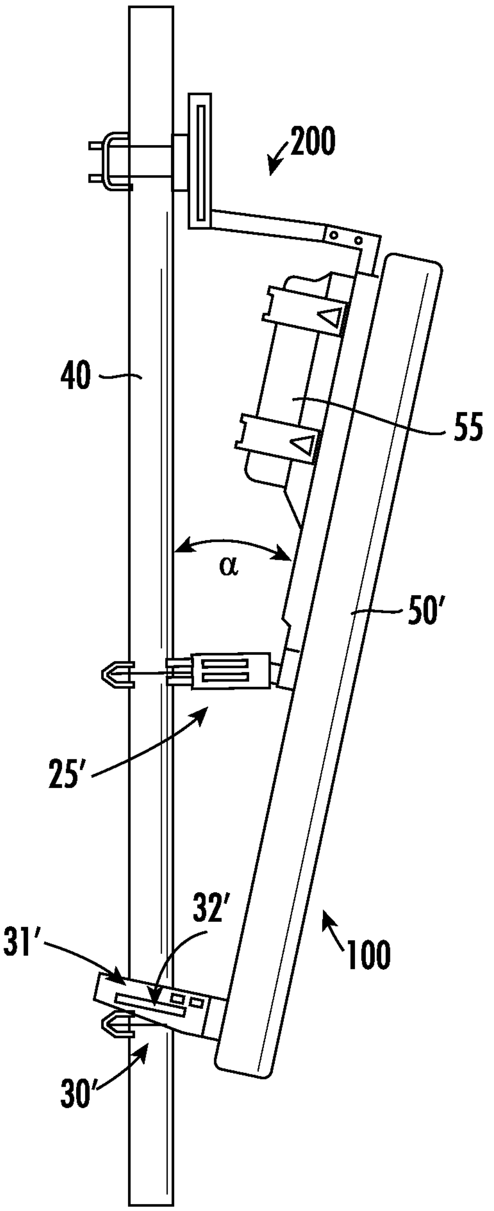
FIG. 3B is a side view of the antenna assembly of FIG. 3A illustrating the maximum angle of downtilt employed on the antenna utilizing an adjustable downtilt mounting bracket assembly according to embodiments of the present invention.

Referring now to the figures, an adjustable downtilt antenna assembly according to embodiments of the present invention, designated broadly at 100, is illustrated in FIGS. 3A-3B. The adjustable downtilt antenna assembly 100 is designed to replace the top mounting bracket 20' of prior known adjustable downtilt antenna assemblies 10, 10' (see e.g., FIGS. 1 and 2) with an adjustable downtilt mounting bracket 200 that utilizes a "slider-crank"-type mechanism. As shown in FIGS. 3A-3B, the other mounting brackets on the assembly 100 (i.e., middle mounting bracket 25' and bottom mounting bracket 30') function similarly to the mounting brackets used in the prior adjustable downtilt antenna assemblies 10, 10' described above and illustrated in FIG. 1 and FIG. 2. The brackets 200, 25', 30' of the assembly 100 of the present invention are configured to secure an antenna 50' (and corresponding radio 55, where applicable) to a mounting structure 40 (e.g., a mounting pole) and work together to adjust an antenna 50 (and radio 55) to a desired downtilt angle (α).

Figure 4A:
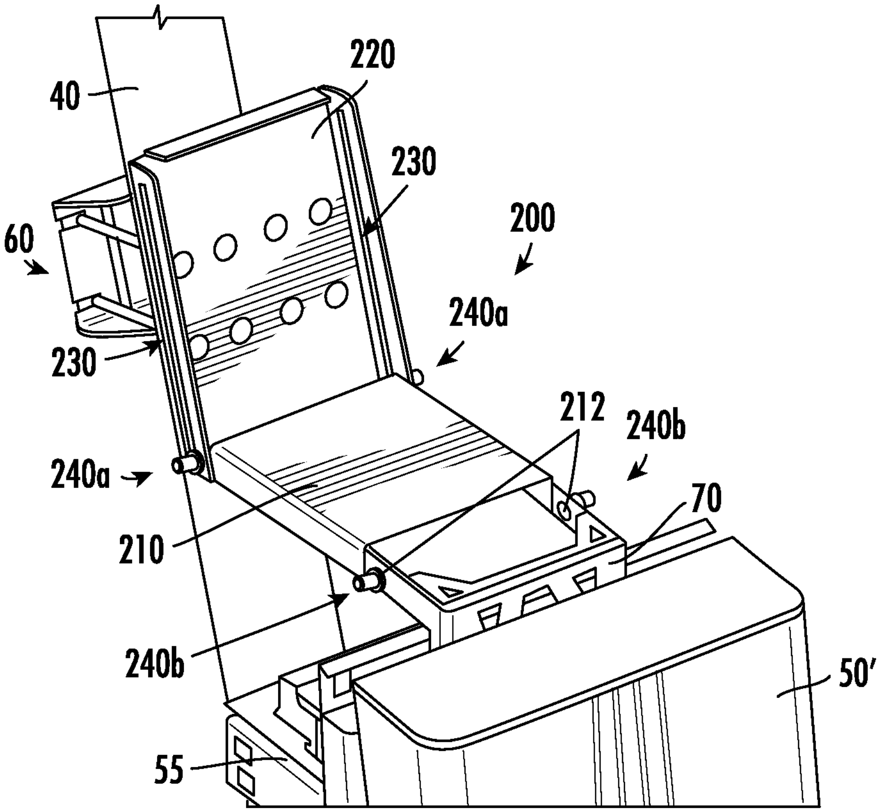
FIG. 4A is a top perspective view of a manually adjustable downtilt mounting bracket assembly according to embodiments of the present invention.
Figure 4B:
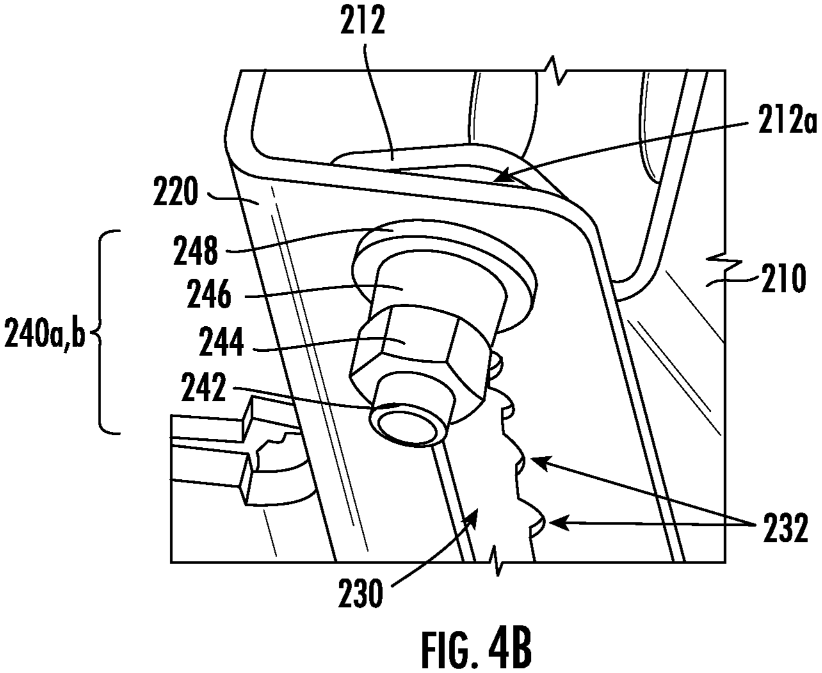
FIG. 4B is an enlarged view of a section of the adjustable downtilt mounting bracket assembly of FIG. 4A as designated in FIG. 3A.
Figure 4C:
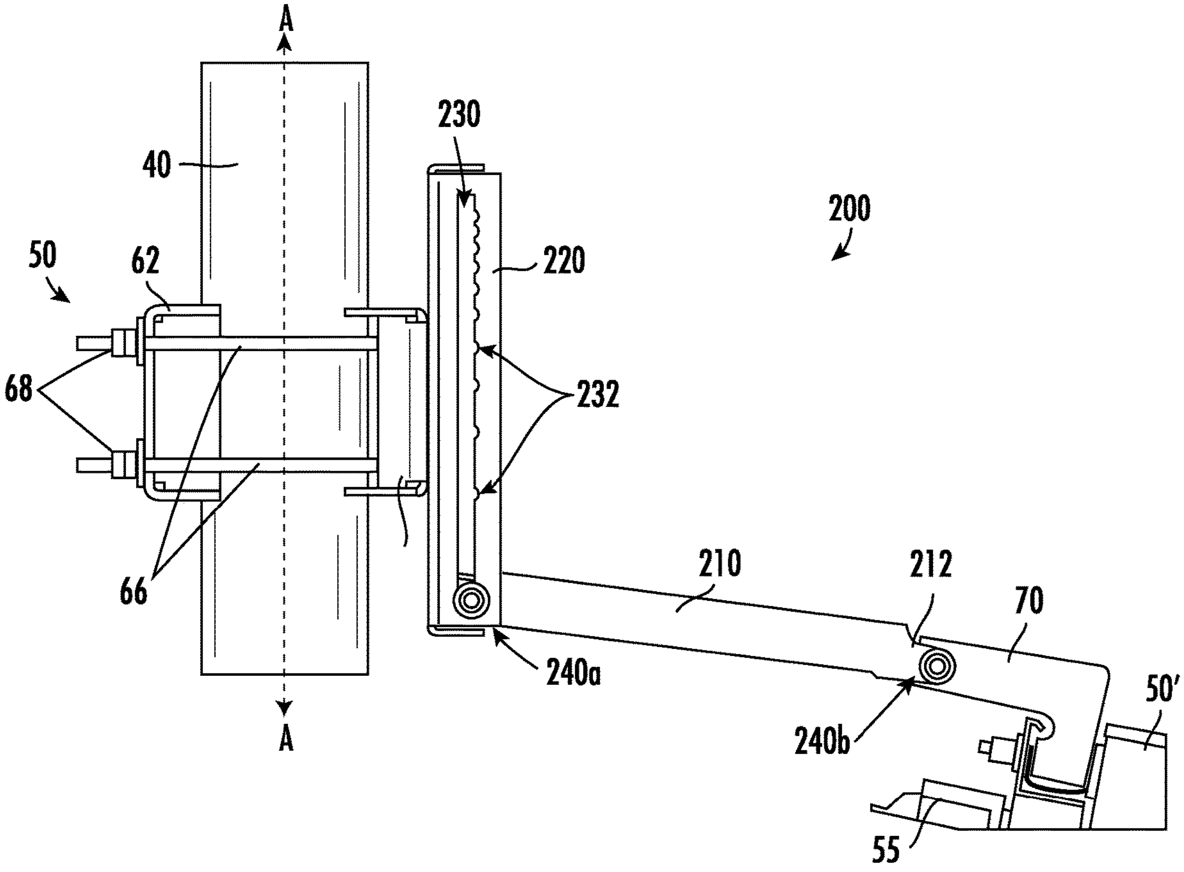
FIG. 4C is a side view of the adjustable downtilt mounting bracket assembly of FIG. 4A, shown in the maximum downtilt position.

Referring to FIGS. 4A-4C, an adjustable downtilt mounting bracket 200 according to embodiments of the present invention is illustrated. As described in further detail below, the mounting bracket 200 illustrated in FIGS. 4A-4C allows for manual adjustment to the downtilt angle (α) of a corresponding antenna 50'.

As shown in FIG. 4A, the bracket 200 includes a first member 210 and a second member 220. The first member 210 is coupled to the second member 220 via a pair of securing features 240*a*. In some embodiments, the first member 210 may include a pair of flanges or arms 212 that extend outwardly from each opposing end of the first member 210. Each of the flanges or arms 212 include an aperture 212*a* configured to receive a respective securing feature 240*a*. As shown in FIG. 4B, in some embodiments, each securing feature 240*a* may comprise a bolt 242, a nut 244, a sleeve 246, and a washer 248. The sleeve 246 replaces an additional nut 244 (and washer 248) which reduces the total number of nuts 244 required to be loosened/tightened during adjustment of the downtilt of the antenna 50', thereby simplifying operation, and reducing operation costs. The sleeve 246 may also help to prevent the nut 244 from becoming loose over time.

As shown in FIGS. 4A-4C, the second member 220 of the bracket 200 includes two slots 230 residing on opposing sides, each of which extends longitudinally along a length of the second member 220. When secured to a mounting structure 40, the slots 230 extend substantially parallel to a longitudinal axis (A) of the mounting structure 40 (i.e., in a vertical direction) (see, e.g., FIG. 4C). In some embodiments, the bolt 242 of each securing feature 240*a* is received within a respective slot 230 of the second member 220. The bolts 240 are able to slide within their respective slot 230. Each bolt 242 is further received through a corresponding aperture 212*a* in the first member 210, thereby coupling the first and second members 210, 220 together. When coupled together, the first member 210 is able to rotate about the securing features 240*a* (i.e., the bolt 242) relative to the second member 220. Thus, the first member 210 is able to both rotate and slide relative to the second member 220. As shown in FIG. 4C, in some embodiments, each slot 230 may comprise a plurality of spaced apart recesses 232 that, as discussed further below, correspond to different angles (α) of downtilt (i.e., degrees of downtilt) that a corresponding antenna 50' may be adjusted.

The first member 210 is also coupled to an antenna mounting bracket 70 (which is secured to the antenna 50') via a second pair of securing features 240*b*. In some embodiments, the securing features 240*b* are similar to the securing features 240*a* described above (see, e.g., FIG. 4B). In some embodiments, each of the flanges or arms 212 on the opposing end of the first member 210 also have an aperture 212*a* configured to receive a securing feature 240*b*, thereby coupling the first member 210 to the antenna mounting bracket 70. The first member 210 is also able to rotate about the securing features 240*b* relative to the antenna mounting bracket 70.

The second member 220 is configured to be secured to a mounting structure 40 (e.g., a mounting pole). For example, in some embodiments, the second member 220 may be mounted to the mounting structure 40 via a pipe clamp 60 (see e.g., FIGS. 4A and 4C). As shown in FIG. 4C, in some embodiments, the pipe clamp 60 may include two clamping members 62, 66 that secure the mounting structure 40 therebetween. A plurality of rods 66 (e.g., threaded rods) and corresponding securing components 68 (e.g., nuts) fix the two clamping member 62, 66 relative to each other and onto the mounting structure 40.

In operation, to adjust the angle of downtilt for a corresponding antenna 50', first a technician loosens the nuts 244 of the securing features 240*a*, 240*b*. Loosening the nuts of the securing features 240*a* allows the corresponding bolts 242 to freely slide within the respective slots 230 of the second member 210, while also allowing the first member 210 to rotate with respect to the second member 220 and antenna mounting bracket 70. The bolts 242 are slid within the slots 230 to a respective recess 232 corresponding to the desired angle (α) of downtilt for the antenna 50'. In some embodiments, each recess 232 may correspond to an angle (α) of downtilt ranging from about 0 degrees of downtilt to about 15 degrees of downtilt. For example, in some embodiments, each slot 230 may comprise 15 recesses 232, each recess 232 able to receive one of the blots 242 and correspond to 1 degree of downtilt.

As the bolts 242 are slid within the slots 230, the first member 210 of the bracket 200 is able to rotate relative to the second member 220. For example, FIG. 3A illustrates the assembly when the bolts 242 are slid to the top of the slots 230, which represents an upright position in which the antenna 50' is at its minimum downtilt angle (α). As illustrated, the first member 210 rotates toward the second member 220 such that the antenna 50' is drawn toward the mounting structure 40, decreasing the degree of downtilt angle (α) (e.g., 0 degrees). FIG. 3B illustrates the assembly when the bolts 242 are slid to the bottom of the slots 230, which represents an angled position in which the antenna 50' is disposed at its maximum downtilt angle (α). As illustrated, the first member 210 rotates away from the second member 220 such that the antenna 50' is forced away from the mounting structure 40, increasing the degree of downtilt angle (α) (e.g., 15 degrees). As the antenna 50' is "pulled" or "pushed" from the mounting structure 40 through adjustment of the mounting bracket 200, the antenna 40 also pivots (or rotates) with respect to the middle and bottom mounting brackets 25', 30'. As shown in FIGS. 3A-3B, in some embodiments, the antenna 40 pivots (or rotates) about the middle mounting bracket 25'. In some embodiments, the bottom bracket 30' may comprise bolts 31' that are configured to slide within respective slots 32' to accommodate movement of the lower end of the antenna 50' toward the pole 40 when the downtilt angle (α) of the antenna 40 is increased during adjustment.

The accuracy of the downtilt angle (α) may be checked (e.g., wirelessly) through a micro-electromechanical system (MEMS) within the antenna 50'. When the downtilt angle ($\alpha$) is confirmed, the technician will tighten the securing features 240*a*, 240*b* to lock the mounting bracket 200 at the desired downtilt angle ($\alpha$).

Figure 5A:
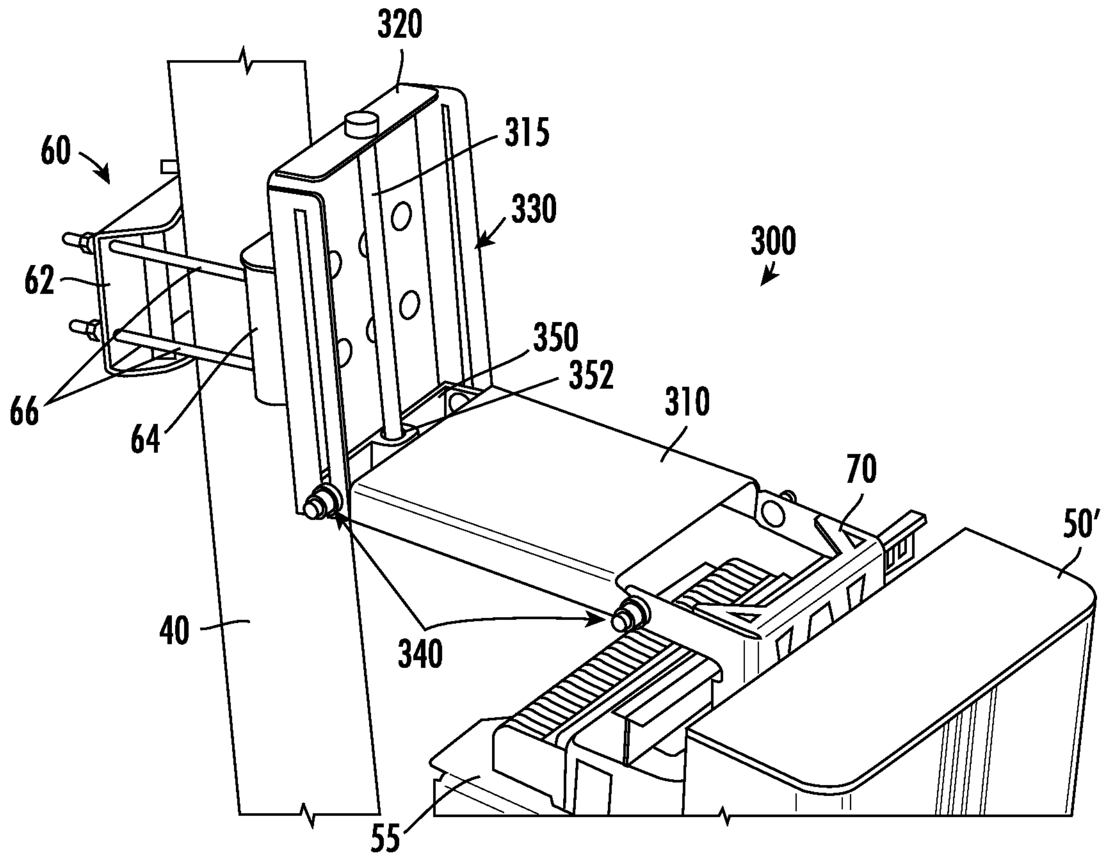
FIG. 5A is a top perspective view of a partially automatic adjustable downtilt mounting bracket assembly according to embodiments of the present invention, shown in the maximum downtilt position
Figure 5B:
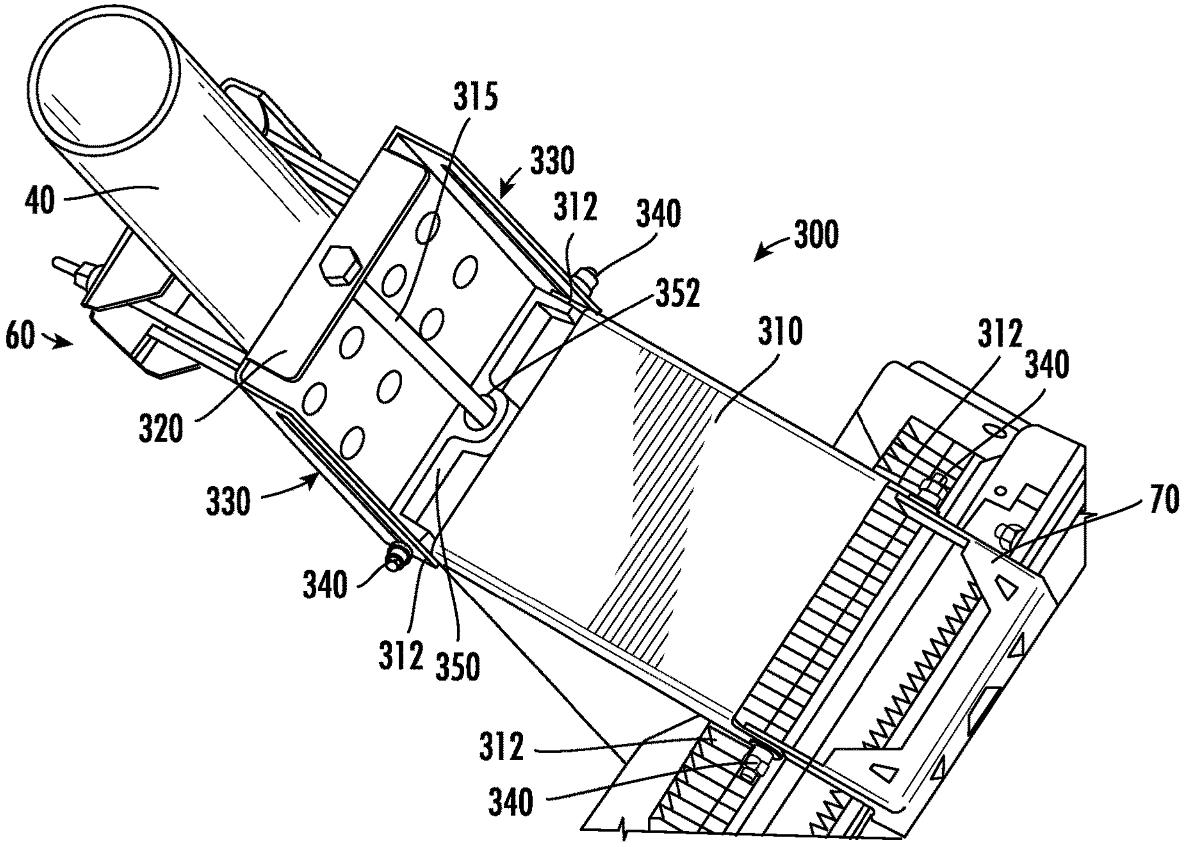
FIG. 5B is a top perspective view of the of the adjustable downtilt mounting bracket assembly of FIG. 5A
Figure 5C:
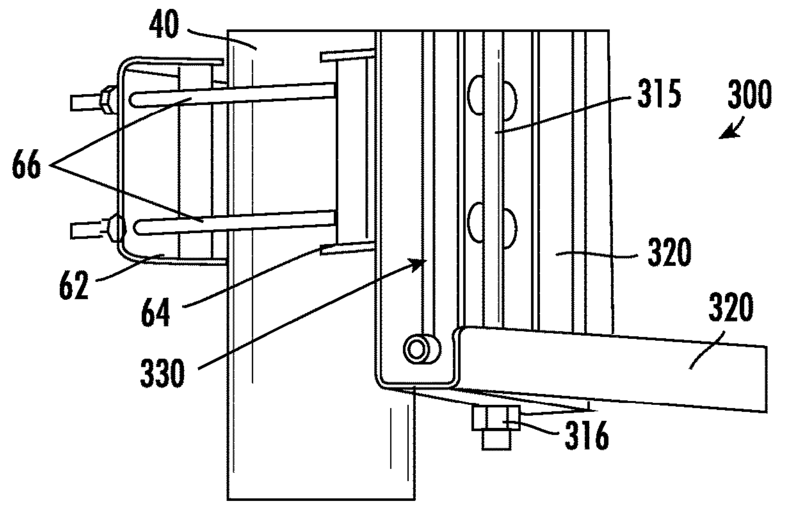
FIG. 5C is a bottom perspective view of the adjustable downtilt mounting bracket assembly of FIG. 5A.

Referring to FIGS. 5A-5C, an alternative adjustable downtilt mounting bracket 300 according to embodiments of the present invention is illustrated. Properties and/or features of the mounting bracket 300 may be as described above in reference to the mounting bracket 200 shown in FIGS. 4A-4C and duplicate discussion thereof may be omitted herein for the purposes of discussing FIGS. 5A-5C. As described in further detail below, the mounting bracket 300 illustrated in FIGS. 5A-5C allows for partial automatic adjustment to the downtilt angle of an antenna 50'.

As shown in FIGS. 5A and 5B, the bracket 300 includes a first member 310, a second member 320, and an adjustment slider 350. The adjustment slider 350 fits within the second member 320 and is slidably secured to the second member 320. In some embodiments, the adjustment slider 350 is slidable about an adjustment bolt 315. In some embodiments, the adjustment bolt 315 may be received through an aperture 352 in the adjustment slider 350. For example, as shown in FIG. 5C, the adjustment bolt 315 extends through the aperture 352 in the adjustment slider 350 and is secured with a nut 316.

The second member 320 includes two slots 330 on opposing sides that each extend longitudinally along a length of the second member 320. When secured to a mounting structure 40, the slots 330 extend substantially parallel to a longitudinal axis (A) of the mounting structure 40 (similar to the mounting bracket 200 illustrated in FIG. 4C). The first member 310 is coupled to the second member 320 and the adjustment slider 350 via a pair of securing features 340.

Each securing feature 340 (e.g., bolt) is received within a respective slot 230 of the second member 320 and is able to slide within the slot 330. Each securing feature 340 is further received through corresponding apertures in the first member 310 and the adjustment slider 350, thereby coupling the first and second members 310, 320 and the adjustment slider 350 together. When coupled together, the first member 310 is able to rotate about the securing features 340 relative to the second member 320 and the adjustment slider 350. Similar to the first member 210 of mounting bracket 200 described herein, in some embodiments, the first member 310 may include a pair of flanges or arms 312 that extend outwardly from each opposing end of the first member 310. In some embodiment, each of the flanges or arms 312 includes an aperture configured to receive a respective securing feature 340. As shown in FIG. 5B, the flanges 312 of the first member 310 are received and secured between the slots 330 of the second member 320 and the adjustment slider 350, thereby allowing the first member 310 to rotate therebetween.

In operation, to adjust the angle of downtilt for a corresponding antenna 50', first a technician loosens the securing features 340 which will allow the first member 310 to rotate with respect to the second member 320 (and the adjustment slider 350) and the antenna mounting bracket 70. The technician will then rotate the adjustment bolt 315 clockwise or counterclockwise, thereby causing the adjustment slider 350 to move longitudinally relative to the slots 330 of the second member 320 (i.e., in a vertical direction). The technician rotates the adjustment bolt 315 until the desired angle ($\alpha$) of downtilt is achieved. In some embodiments, there may be indica (e.g., silk screen printing, stamping letters, or similar markings) along the slots 330 corresponding to the downtilt angles ($\alpha$) to let a technician know where to slide the adjustment slider 350. The securing features 340 maintain the adjustment slider 350 within the second member 320 as the adjustment slider 350 is being moved relative to the adjustment bolt 315 and the second member 320. As the securing features 340 are slid within the slots 330, the first member 310 of the bracket 300 is able to rotate relative to the second member 320 and adjustment slider 350, thereby allowing for similar movement described above and illustrated in FIGS. 3A-3B.

Thus, as shown in FIG. 3A, when the adjustment bolt 315 is rotated in one direction, the adjustment slider 350 moves toward the top of the slots 230 which causes the first member 310 to rotate toward the second member 320 such that the antenna 50' is drawn toward the mounting structure 40, thereby decreasing the degree of downtilt angle ($\alpha$) (e.g., 0 degrees). When the adjustment bolt 315 is rotated in the opposite direction, the adjustment slider 350 moves toward the bottom of the slots 330, as shown in FIG. 3B, which causes first member 310 to rotate away from the second member 320 such that the antenna 50' is forced away from the mounting structure 40, thereby increasing the degree of downtilt angle ($\alpha$) (e.g., 15 degrees).

The accuracy of the downtilt angle ($\alpha$) may be checked (e.g., wirelessly) through a MEMS within the antenna 50'. When the downtilt angle ($\alpha$) is confirmed, the technician will tighten the securing features 340 to lock the mounting bracket 300 (and corresponding antenna 50') at the desired downtilt angle ($\alpha$).

Similar to the mounting bracket 200 described herein, the second member 320 of mounting bracket 300 is configured to be secured to a mounting structure 40 (e.g., a mounting pole). For example, in some embodiments, the second member 320 may be mounted to the mounting structure 40 via a pipe clamp 60 as described herein.

Referring to FIGS. 6A-6D, an adjustable downtilt mounting bracket 400 according to embodiments of the present invention is illustrated. Properties and/or features of the mounting bracket 400 may be as described above in reference to the mounting brackets 200, 300 shown in FIGS. 4A-4C and FIGS. 5A-5C and duplicate discussion thereof may be omitted herein for the purposes of discussing FIGS. 6A-6D. As described in further detail below, the mounting bracket 400 illustrated in FIGS. 6A-6D allows for fully-automatic adjustment to the downtilt angle of an antenna 50'.

Figure 6A:
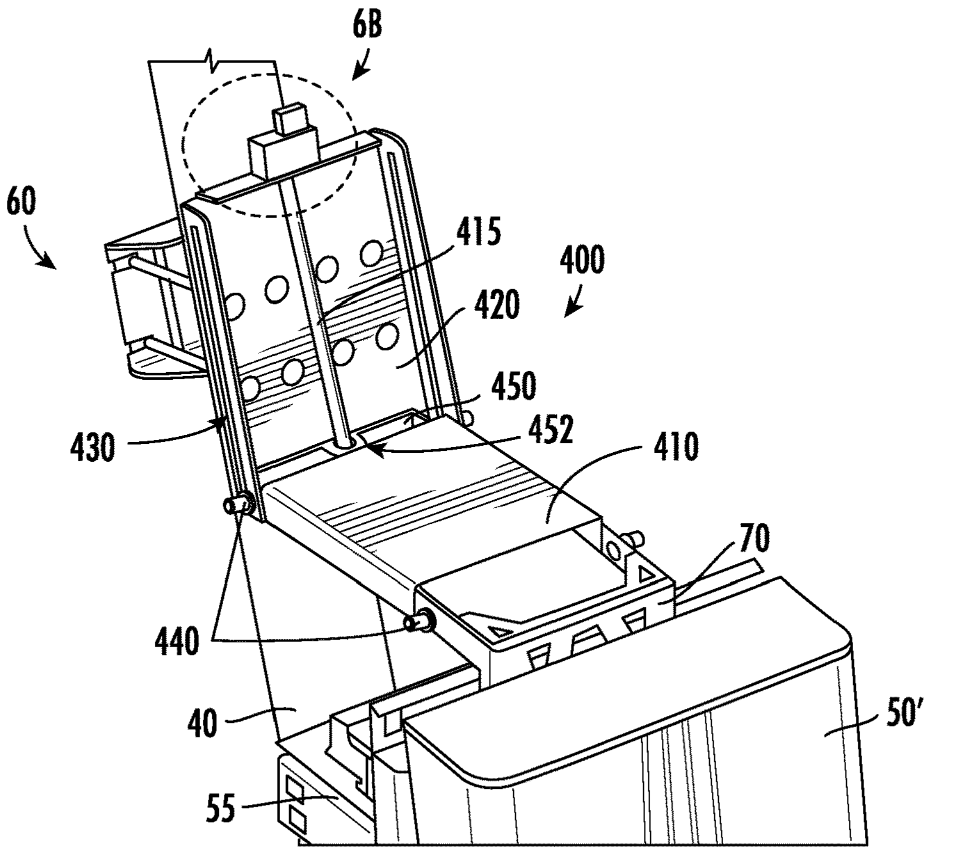
FIG. 6A is a top perspective view of a fully automatic adjustable downtilt mounting bracket assembly according to embodiments of the present invention, shown in the maximum downtilt position.
Figure 6B:
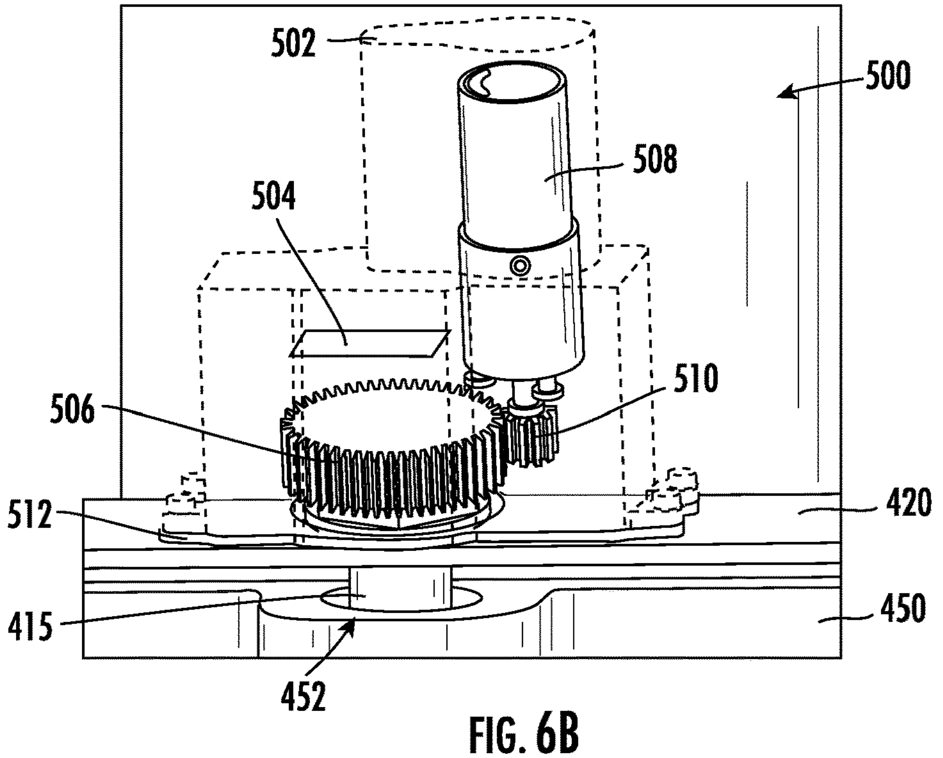
FIG. 6B is an enlarged view of a driving mechanism for the adjustable downtilt mounting bracket assembly of FIG. 6A.

As shown in FIGS. 6A and 6B, the adjustable downtilt mounting bracket 400 is identical to mounting bracket 300, except the mounting bracket 400 further includes a driving mechanism 500. The driving mechanism 500 is secured to the second member 420 and connected with the adjustment bolt 415. The driving mechanism 500 is configured to rotate the adjustment bolt 415 which drives the adjustment slider 450 within the second member 420 until the desired angle ($\alpha$) of downtilt is achieved.

Figure 6C:
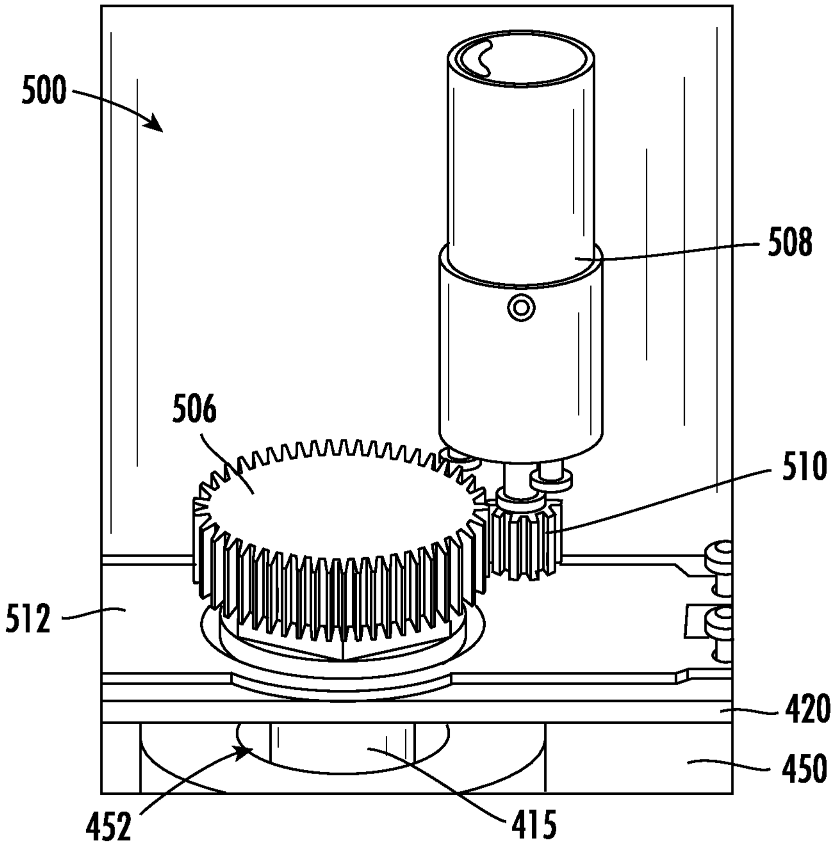
FIG. 6C is an enlarged view of some of the internal components to the driving mechanism of FIG. 6B.

The driving mechanism 500 is illustrated in FIG. 6B. As shown in FIG. 6B, in some embodiments, the driving mechanism 500 may comprise a drive motor 508, a pinion 510, a gear wheel 506, and a printed circuit board (PCB) 504. In some embodiments, the driving mechanism 500 may have a removable outer housing 502 to protect the internal components. In some embodiments, a dustproof mat 512 may be secured between the driving mechanism 500 and the second member 420. As shown in FIG. 6C, the pinion 510 couples the drive motor 508 to the gear wheel 506 which is coupled to the adjustment bolt 415. The drive motor 508 may be powered from the antenna interface or active antenna.

In operation, to adjust the angle of downtilt for a corresponding antenna 50', first a technician loosens the securing features 440 which will allow the first member 410 to rotate with respect to the second member 420 (and adjustment slider 450) and antenna mounting bracket 70. The technician activates the driving mechanism 500 to rotate the gear wheel 506 (and subsequently the adjustment bolt 415) clockwise or counterclockwise, thereby causing the adjustment slider 450 to move longitudinally relative to the slots 430 of the second member 420 (i.e., in the vertical direction) until the desired angle (α) of downtilt is achieved. The securing features 440 maintain the adjustment slider 450 secured within the second member 420 as the adjustment slider 450 is being moved. As the securing features 440 are slid within the slots 430, the first member 410 of the bracket 400 is able to rotate relative to the second member 420 and adjustment slider 450 allowing for similar movement as described herein and illustrated in FIGS. 3A-3B.

Figure 6D:
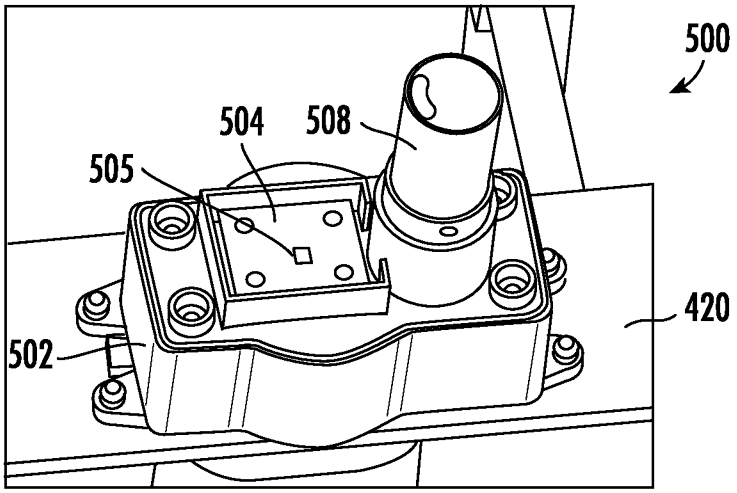
FIG. 6D is a top perspective view of the driving mechanism of FIG. 6A with the outer housing removed.

The accuracy of the downtilt angle (α) may be checked through a MEMS 505 located on the PCB 504 of the driving mechanism 500 (see, e.g., FIG. 6D). When the downtilt angle (α) is confirmed, the technician will tighten the securing features 440 to lock the mounting bracket 400 (and corresponding antenna 50') at the desired downtilt angle (α).

Figure 7:
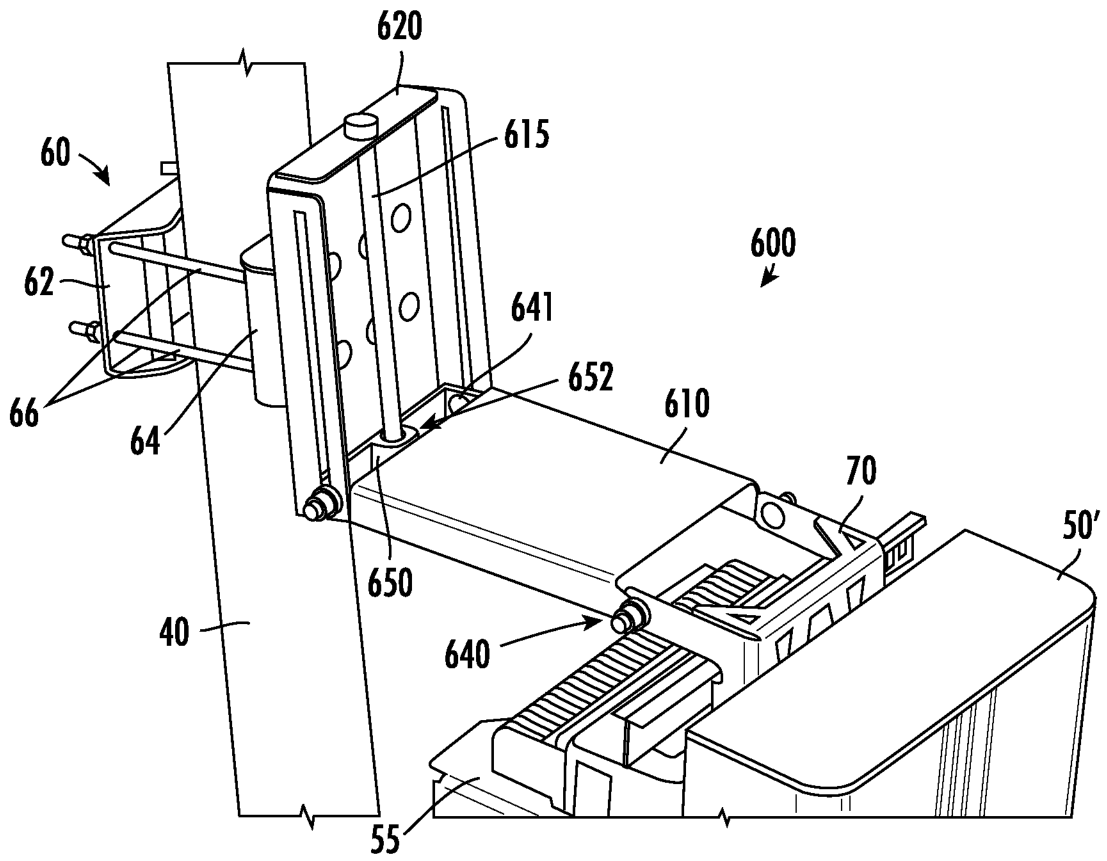
FIG. 7 is a top perspective view of an alternative adjustable downtilt mounting bracket assembly according to embodiments of the present invention.

Referring to FIG. 7, an alternative adjustable downtilt mounting bracket 600 according to embodiments of the present invention is illustrated. Properties and/or features of the mounting bracket 600 may be as described above in reference to the mounting brackets 200, 300, 400 shown in FIGS. 4A-4C, FIGS. 5A-5C, and FIGS. 6A-6D and duplicate discussion thereof may be omitted herein for the purposes of discussing FIG. 7.

As shown in FIG. 7, the adjustable downtilt mounting bracket 600 is identical to mounting bracket 300, except for the second member 620 of mounting bracket 600 does not include slots (i.e., slots 330 shown in FIG. 5A). Instead, the first member 310 is coupled directly to the adjustment slider 650 via one or more securing features 641. When coupled together, the first member 310 is able to rotate about the securing features 641 relative to the adjustment slider 350.

Operation of the mounting bracket 600 is similar to mounting bracket 300 described herein. To adjust the angle of downtilt for a corresponding antenna 50', first a technician loosens the securing features 640 which will allow the first member 610 to rotate with respect to the antenna mounting bracket 70. However, to allow the first member 610 to rotate with respect to the adjustment slider 650, the technician will need to loosen a set screw or other similar locking feature (not shown). The technician will then rotate the adjustment bolt 615 clockwise or counterclockwise, thereby causing the adjustment slider 650 to move longitudinally relative to a slidable axis defined by the adjustment bolt 615 which is substantially parallel to the mounting structure 40 (i.e., in a vertical direction). The technician rotates the adjustment bolt 615 until the desired angle (α) of downtilt is achieved. As the adjustment slider 650 is slid along the adjustment bolt 615, the first member 610 of the bracket 600 is able to rotate relative to the adjustment slider 650, thereby allowing for similar movement described above and illustrated in FIGS. 5A-5C.

Figure 8:
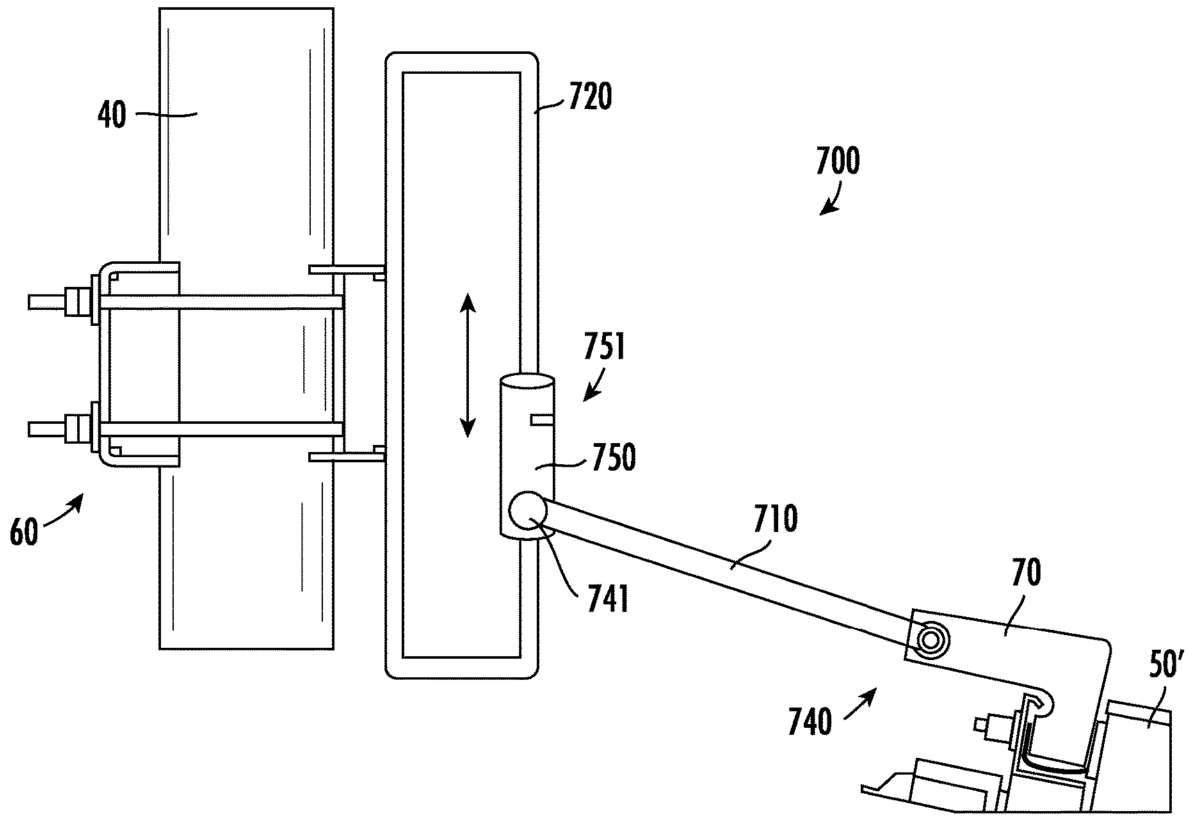
FIG. 8 is a side view of an alternative adjustable downtilt mounting bracket assembly according to embodiments of the present invention.

Referring to FIG. 8, an alternative adjustable downtilt mounting bracket 700 according to embodiments of the present invention is illustrated. Properties and/or features of the mounting bracket 700 may be as described above in reference to the mounting brackets 200, 300, 400, 600 shown in FIGS. 4A-4C, FIGS. 5A-5C, FIGS. 6A-6D, and FIG. 7 and duplicate discussion thereof may be omitted herein for the purposes of discussing FIG. 8.

As shown in FIG. 8, the mounting bracket 700 includes a first member 710, a second member 720, and an adjustment slider or sleeve 750. The second member 720 is configured to be secured to a mounting structure 40 (e.g., a mounting pole). For example, similar to the other mounting brackets 200, 300, 400, 600 described herein, the second member 720 of mounting bracket 700 may be secured to the mounting structure 40 via a pipe clamp 60. The second member 720 defines an axis that is substantially parallel to the mounting structure 40 (i.e., in a vertical direction). The sleeve 750 is coupled to the second member 720 and is configured to slide along the axis defined by the second member 720.

The first member 710 is coupled to the sleeve 750 at one end via a first securing feature 741 and is coupled to an antenna mounting bracket 70 at an opposing end via a second securing feature 740. The securing features 740, 741 may be similar to the securing features described herein. When coupled together, the first member 710 is able to rotate about the securing feature 741 relative to the sleeve 750 and able to rotate about securing feature 740 relative to the antenna mounting bracket 70.

In operation, to adjust the angle of downtilt for a corresponding antenna 50', first a technician loosens the securing features 740, 741 which will allow the first member 710 to rotate with respect to the adjustment sleeve 750 and antenna mounting bracket 70, respectively. The technician then loosens a set screw 751 or similar locking mechanism on the sleeve 750 which allows the technician to slide the sleeve 750 along at least a portion of the second member 720 (i.e., in the vertical direction). The securing feature 741 maintains the first member 710 secured to the sleeve 750 as the sleeve 750 is being moved. The sleeve 750 may be raised or lowered (i.e., slid) along the second member 720 until the desired angle (α) of downtilt is achieved. In some embodiments, the second member 720 may comprise indica corresponding to the downtilt angles (α) (similar to those described herein) to let a technician know where to slide the sleeve 750. In other embodiments, the second member 720 may have recesses (not shown) corresponding to the downtilt angles (α), e.g., similar to other mounting brackets described herein. As the sleeve 750 slides along the second member 720, the first member 710 of the bracket 700 is able to rotate relative to the sleeve 750 allowing for similar movement as described herein with respect to the other mounting brackets. Once a desired angle (α) of downtilt is achieved, the technician tightens the set screw 751 on the sleeve 750 to lock the mounting bracket 700 in position.

The adjustable downtilt mounting brackets 200, 300, 400, 600, 700 according to embodiments of the present invention described herein may provide advantages over existing adjustable mounting brackets. Some of these advantages may include, but are not limited to: higher strength (e.g., mounting brackets of the present invention may be used with antenna/radio unit assemblies), easier installation and adjustment (mounting bracket of the present invention require fewer nuts to be adjusted/tightened, e.g., only 8 nuts to adjust compared to 16 or 28 nuts), lower installation costs, lower space requirement compared with antenna/radio unit assemblies (e.g., limits interference with the installation of other antennas on the same mounting pole), and higher accuracy of mechanical downtilt adjustment.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A mounting bracket adapted for adjusting the downtilt of an antenna, the mounting bracket comprising:

a first member and a second member, the first member coupled to the second member at one end via a first pair of securing features and coupled to an antenna mounting bracket at an opposing end via a second pair of securing features, wherein the first member is configured to rotate about the first and second pairs of securing features relative to the second member and antenna mounting bracket, respectively;

the second member comprises two slots on opposing sides that extend longitudinally along a length of the second member in a vertical direction, each of the first pair of securing features extends through and is configured to slide within a respective slot such that, when an antenna is secured to the antenna mounting bracket, sliding the first pair of securing features in a first direction increases an angle of downtilt for the antenna and sliding the first pair of securing features in a second direction decreases the angle of downtilt for the antenna, wherein the second member is configured to be secured to a mounting structure.

2. The mounting bracket of claim 1, wherein each slot of the second member comprises a plurality of recesses, each recess corresponding to a respective angle of downtilt that a corresponding antenna assembly can be adjusted.

3. The mounting bracket of claim 2, wherein the angle of downtilt is in a range of from about 0 degrees to about 15 degrees.

4. The mounting bracket of claim 1, wherein the first member includes a pair of flanges that extend outwardly from each opposing end of the first member, each of the flanges includes an aperture configured to receive a respective securing feature.

5. The mounting bracket of claim 1, further comprising an adjustment slider that fits within the second member and is configured to be slidable relative to the second member and pivotable relative to the first member.

6. The mounting bracket of claim 5, wherein the adjustment slider is secured within the second member via an adjustment bolt that is received through an aperture in the adjustment slider and is configured to be raised or lowered within the second member via rotation of the adjustment bolt to adjust the downtilt angle of a corresponding antenna.

7. The mounting bracket of claim 5, further comprising a driving mechanism connected with the adjustment bolt and configured to rotate the adjustment bolt to raise or lower the adjustment.

8. The mounting bracket of claim 1, in combination with an antenna assembly secured to the mounting bracket via the antenna mounting bracket.

9. A method of adjusting the downtilt of an antenna, the method comprising:

providing the mounting bracket defined in claim 8;

loosening the securing features;

sliding the first pair of securing features within their respective slots in the second member, wherein sliding the securing features toward the top of the slots rotates the first member to decrease the downtilt angle of the antenna assembly and sliding the securing features toward the bottom of the slots rotates the first member to increase the downtilt angle of the antenna assembly; and tightening the securing features to lock the antenna assembly at a desired downtilt angle.

10. The method of claim 9, further comprising rotating the adjustment bolt to raise or lower the adjustment slider.

11. The method of claim 9, further comprising activating the driving mechanism to rotate the adjustment bolt to raise or lower the adjustment slider.

12. The method of claim 9, further comprising checking the accuracy of the downtilt angle for the antenna assembly via a micro-electromechanical system prior to tightening the securing features.

13. A mounting bracket adapted for adjusting the downtilt of an antenna, the mounting bracket comprising:

a first member and a second member;

the second member comprises two slots on opposing sides and extending longitudinally along a length of the second member in a vertical direction, wherein each of a first pair of securing features extends through and is configured to slide within a respective slot, an adjustment slider slideably coupled within the second member via the first pair of securing features and an adjustment bolt;

the first member coupled to the second member and adjustment slider at one end via the first pair of securing features and coupled to an antenna mounting bracket at an opposing end via a second pair of securing features, wherein the first member is configured to rotate about the first and second pairs of securing features relative to the second member and antenna mounting bracket, respectively;

wherein rotation of the adjustment bolt raises or lowers the adjustment slider relative to the second member to adjust the angle of downtilt of a corresponding antenna, and wherein the second member is configured to be secured to a mounting structure.

14. The mounting bracket of claim 13, wherein the angle of downtilt is in a range of from about 0 degrees to about 15 degrees.

15. The mounting bracket of claim 13, wherein the first member includes a pair of flanges that extend outwardly from each opposing end of the first member, each of the flanges includes an aperture configured to receive a respective securing feature.

16. The mounting bracket of claim 13, further comprising a driving mechanism connected with the adjustment bolt and configured to rotate the adjustment bolt to raise or lower the adjustment.

17. A mounting bracket adapted for adjusting the downtilt of an antenna, the mounting bracket comprising:

a first member and a second member;

the second member comprises two slots on opposing sides and extending longitudinally along a length of the second member in a vertical direction, wherein each of the first pair of securing features extends through and is configured to slide within a respective slot, an adjustment slider slideably coupled within the second member via the first pair of securing features and an adjustment bolt;

the first member coupled to the second member and adjustment slider at one end via a first pair of securing features and coupled to an antenna mounting bracket at an opposing end via a second pair of securing features, wherein the first member is configured to rotate about the first and second pairs of securing features relative to the second member and antenna mounting bracket, respectively; and a driving mechanism coupled to the adjustment bolt;

wherein the driving mechanism is configured to rotate the adjustment bolt to raise or lower the adjustment slider relative to the second member to adjust the angle of downtilt of a corresponding antenna, and wherein the second member is configured to be secured to a mounting structure.

18. The mounting bracket of claim 17, wherein the angle of downtilt is in a range of from about 0 degrees to about 15 degrees.

19. The mounting bracket of claim 17, wherein the first member includes a pair of flanges that extend outwardly from each opposing end of the first member, each of the flanges includes an aperture configured to receive a respective securing feature.

20. The mounting bracket of claim 17, wherein the driving mechanism comprises a drive motor, a pinion, a gear wheel, and a printed circuit board.

* * * * *